(12) United States Patent
Schwend et al.

(10) Patent No.: US 6,823,058 B1
(45) Date of Patent: Nov. 23, 2004

(54) METHOD AND SYSTEM FOR FORWARDING CALLS

(75) Inventors: Peggy S. Schwend, Phoenix, AZ (US);
Martin R. Marks, Phoenix, AZ (US);
John M. Verbil, Scottsdale, AZ (US);
Karen A. Parry, Scottsdale, AZ (US);
Lotus A. Mardick, Overland, KS (US)

(73) Assignee: Qwest Communications International Inc., Denver, CO (US)

(*) Notice: Subject to any disclaimer, the term of this patent is extended or adjusted under 35 U.S.C. 154(b) by 472 days.

(21) Appl. No.: 09/637,978

(22) Filed: Aug. 11, 2000

Related U.S. Application Data

(60) Provisional application No. 60/215,041, filed on Jun. 29, 2000.

(51) Int. Cl.[7] .................................................. H04M 3/42
(52) U.S. Cl. ............................. 379/213.01; 379/142.09; 379/211.01; 379/211.02
(58) Field of Search .................. 379/88.25, 142.09, 379/207.02, 207.04, 207.05, 207.08, 211.01, 211.02, 213.01, 219, 221.08, 230

(56) References Cited

U.S. PATENT DOCUMENTS

| | | | | |
|---|---|---|---|---|
| 5,583,564 A | * | 12/1996 | Rao et al. | 348/14.01 |
| 5,778,052 A | * | 7/1998 | Rubin et al. | 379/88.25 |
| 5,832,061 A | * | 11/1998 | Rubin | 379/88.1 |
| 5,854,836 A | * | 12/1998 | Nimmagadda | 379/221.13 |
| 6,141,545 A | * | 10/2000 | Begeja et al. | 455/417 |
| 6,173,050 B1 | * | 1/2001 | Malik | 379/219 |
| 6,337,902 B1 | * | 1/2002 | Weik et al. | 379/114.28 |

* cited by examiner

*Primary Examiner*—Bing Q. Bui
(74) *Attorney, Agent, or Firm*—Townsend and Townsend and Crew LLP

(57) ABSTRACT

A Service Switching Point in an advanced intelligent network includes a trigger associated with a specific digit string and activated by a call to the specific digit string at the SSP. The SSP queries a Service Control Point (SCP) for a forwarding instruction based upon the trigger. In response to the query, the SCP sends the SSP a forward-to telephone number. The SSP then forwards the call to the forward-to telephone number.

16 Claims, 1 Drawing Sheet

METHOD AND SYSTEM FOR FORWARDING CALLS

This application claims priority to No. 60/215,041 filed Jun. 29, 2000.

BACKGROUND OF THE INVENTION

The present invention relates generally to a method and system for forwarding calls, and more particularly to a method and system for forwarding calls in an advanced intelligent network.

When a telephone subscriber moves to a new location, it is sometimes not possible for the subscriber to retain the same telephone number. Currently, calls to the subscriber's old telephone number after disconnection are met with an intercept announcement stating that the number has been disconnected, possibly followed by an announcement stating the subscriber's new number.

If the subscriber desires to have calls to the old number forwarded to the new number for a period of time, the subscriber must maintain the old number as active, where the telephone service provider's Service Switching Point (SSP) assigns a physical switch and wire lines to the subscriber's old telephone number. This increases the cost to the service provider, which is passed along to subscriber.

SUMMARY OF THE INVENTION

The present invention provides a method and system for providing a call forwarding service to a subscriber without wire lines or a physical switch in the SSP. Utilizing the call forwarding of the present invention, calls may be forwarded directly to a voice mail box, which can be the same one the subscriber had prior to the move. This allows the subscriber to record a detailed voice mail greeting informing callers of the move. This also allows the subscriber to use that same voice mail box to receive messages for any length of time.

Additionally, use of the call forwarding service of the present invention also provides call forwarding to another telephone, such as the subscriber's new telephone number. This could also be used for multi-line businesses that wish to disconnect one or more numbers but not lose the calls to those numbers while waiting for directory publications and advertising to reflect the change. Calls to the disconnected numbers would be forwarded to the remaining numbers in the interim.

The call forwarding service of the present invention is preferably implemented in an Advanced Intelligent Network. Generally, an SSP includes a terminating trigger associated with a specific digit string (i.e. the subscriber's "old" telephone number) and activated by a call to the specific digit string at the SSP. Calls to the subscriber's old specific digit string at the SSP cause the SSP to send a query to a Service Control Point (SCP) requesting instructions regarding handling of the call. The SCP returns forwarding instructions to the SSP. As a significant benefit of the present invention, the specific digit string need not be assigned to any physical switch or line at the SSP.

The forwarding instructions from the SCP include a forward-to telephone number. The SSP receives the forwarding instructions and in response forwards the call to the forward-to telephone number. If that number is a voice mail box, the voice mail box plays the subscriber's recorded greeting and allows the caller to leave a message. Alternatively, if the forward-to telephone number is another subscriber line, the SSP forwards the call to that subscriber line.

DETAILED DESCRIPTION OF A PREFERRED EMBODIMENT

Figure 1:
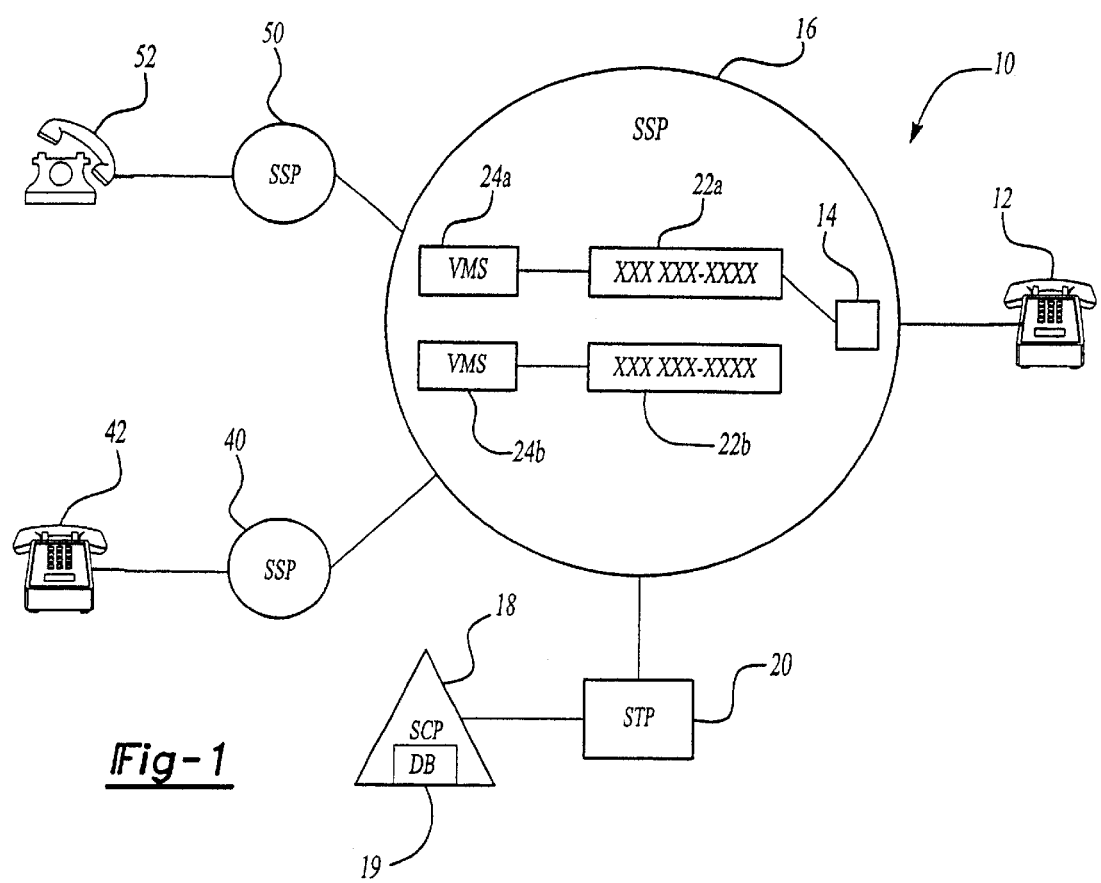
FIG. 1 is a schematic of the call forwarding system of the present invention as implemented in an advanced intelligent network.

A call forwarding system 10 is shown schematically in FIG. 1 as implemented in an advanced intelligent network. As shown in FIG. 1, the call forwarding system 10 of the present invention includes a first subscriber line 12 connected by local telephone lines to a hardware switch 14 in a first Service Switching Point (SSP) 16. The SSP 16 is a well-known AIN programmable switch that recognizes numerous different AIN triggers on the subscriber line 12. In response to the various triggers, the SSP 16 queries a Service Control Point (SCP) 18 having a database 19 via a Signaling Transfer Point (STP) 20 for instructions regarding call routing or call processing.

The SSP 16 is preferably connected to a plurality of subscriber lines, although only subscriber line 12 is shown for simplicity. Each of the subscriber lines, including subscriber line 12 is assigned a specific digit string 22a (i.e. telephone number) associated with its hardware switch 14. In the present invention, the SSP 16 also includes additional specific digit strings, including specific digit string 22b, which are not assigned to a hardware switch or a physical subscriber line. The SSP 16 further preferably includes voicemail boxes 24a,b associated with specific digit strings 22a,b respectively.

In the present invention, one of the types of triggers recognized by the SSP 16 is a terminating trigger, more particularly, a specific digit string trigger. The specific digit string trigger, when activated, is triggered by calls to the SSP 16 to a specific digit string 22.

The call forwarding system 10 of the present invention, as implemented in AIN, includes additional SSPs 40, 50, each having a plurality of subscriber lines 42, 52, respectively (only one shown for clarity). The SSPs 40, 50 may be identical to SSP 16.

The operation of the call forwarding system 10 of the present invention will be described with respect to FIG. 1. First, if call forwarding is not activated, a call from subscriber line 52 to specific digit string 22a will be connected by SSP 16 to subscriber line 12, in accordance with normal AIN operation.

If the call forwarding feature of the present invention is activated for specific digit string 22b, however, a call to specific digit string 22b will trigger the associated specific digit string trigger. In response, the SSP 16 will send the specific digit string 22b to the SCP 18 along with a request for a forward-to telephone number. The SCP 18 receives the query and specific digit string 22b and indexes its database 19 to retrieve the forward-to telephone number associated with specific digit string 22b. The SCP 18 then sends the forward-to telephone number to the SSP 16, which then forwards the call to the forward-to telephone number. The forward-to telephone number may be specific digit string 22a (assigned to subscriber line 12) or the telephone number assigned to subscriber line 42, for example. The forward-to telephone number may also be for voice mail box 24b.

An important advantage of the present invention is the fact that a physical subscriber line 12 and hardware switch 14 are not required in order to provide call forwarding from specific digit string 22b. This provides several advantages.

First, if a subscriber moves and cannot keep his telephone number, the subscriber can maintain his "old" telephone number (specific digit string 22b) at the first SSP 16 for a period of time after the move. The subscriber can use his previous voice mail box 24b to provide detailed instructions regarding his new move and new telephone number. Additionally, calls to the specific digit string 22b can be forwarded to the subscriber's new telephone number assigned to subscriber line 42. In the meantime, the service provider need not assign a subscriber line or hardware switch to the specific digit string 22b, thus reducing cost.

Another useful scenario for the present invention can also be explained with reference to FIG. 1. A multi-line business that has been initially assigned both of the exemplary specific digit strings 22a,b may wish to disconnect one of the specific digit strings 22b. While waiting for directory publications and advertising to reflect the change, calls to specific digit string 22b are forwarded to specific digit string 22a in the interim. Thus, the business does not lose calls in the interim, while the service provider need not provide a physical subscriber line and hardware switch assigned to specific digit string 22b.

The AIN architecture is well-documented and well-known to those skilled in the art and, except as otherwise described above, the operation of the AIN components shown in FIG. 1 is in accordance with published standards. In accordance with the provisions of the patent statutes and jurisprudence, exemplary configurations described above are considered to represent a preferred embodiment of the invention. However, it should be noted that the invention can be practiced otherwise than as specifically illustrated and described without departing from its spirit or scope. Alpha-numeric labels on method steps in the claims below are for convenience of reference by dependent claims, and do not signify a required order of performance of the method steps.

What is claimed is:

1. A method for routing calls in an Advanced Intelligent Network including the steps of:
   a. Detecting a trigger in a terminating Service Switching Point (SSP), wherein the trigger is caused by a call directed to a specific digit string relating to a multi-line business that is unassigned with respect to hardware switches;
   b. Sending a query from the SSP to a Service Control Point (SCP) based upon said step a);
   c. Sending a forwarding number to the SSP in response to said step b); and
   d. Forwarding a call to the forwarding number in response to said step c), wherein the forwarding number relates to the multi-line business.

2. The method of claim 1 wherein the trigger is a specific digit string trigger.

3. The method of claim 1 wherein the SSP does not include a hard-wired subscriber line assigned to the specific digit string.

4. The method of claim 1 wherein said step d) further includes the step of forwarding the call to voice mail.

5. The method of claim 1 wherein said step d) further includes the step of forwarding the call to a subscriber line.

6. The method of claim 5 wherein said step d) further includes the step of forwarding the call from the terminating SSP to a second SSP.

7. The method of claim 6 wherein the trigger is a specific digit string trigger associated with a specific digit string.

8. The method of claim 7 wherein the SSP does not include a hard-wired subscriber line associated with the specific digit string.

9. An Advanced Intelligent Network Service Switching Point (SSP) including:
   a plurality of specific digit strings including a first specific digit string relating to a multi-line business that is unassigned with respect to hardware switches;
   a plurality of subscriber lines each assigned one of said plurality of specific digit strings;
   a trigger associated with said first specific digit string and activated by a call to the first specific digit string at the SSP;
   said SSP generating a request for a forwarding instruction based upon said trigger, and
   said SSP receiving said forwarding instruction and forwarding the call to a specific digit string of the multi-line business based upon the forwarding instruction.

10. The SSP of claim 9 wherein the first specific digit string is not assigned to any of the plurality of subscriber lines.

11. The SSP of claim 9 wherein the forwarding instruction is an instruction to forward to voicemail and the SSP forwards the call to voice mail based upon the forwarding instruction.

12. The SSP of claim 9 wherein the forwarding instruction is an instruction to forward to a subscriber line and the SSP forwards the call to the subscriber line based upon the forwarding instruction.

13. An Advanced Intelligent Network including:
   a Service Control Point (SCP) associating a first specific digit string relating to a multi-line business with a forwarding instruction, wherein the first specific digit string is unassigned with respect to hardware switches;
   a Service Switching Point (SSP) connected to a plurality of subscriber lines;
   a trigger at the SSP associated with the first specific digit string and activated by a call to the first specific digit string at the SSP;
   said SSP sending a request for a forwarding instruction to the SCP based upon said trigger; and
   said SSP receiving said forwarding instruction from the SCP and forwarding the call to a specific digit string of the multi-line business based upon the forwarding instruction.

14. The SSP of claim 13 wherein the first specific digit string is not assigned to any of the plurality of subscriber lines.

15. The SSP of claim 13 wherein the forwarding instruction is an instruction to forward to voicemail and the SSP forwards the call to voice mail based upon the forwarding instruction.

16. The SSP of claim 13 wherein the forwarding instruction is an instruction to forward to a subscriber line and the SSP forwards the call to the subscriber line based upon the forwarding instruction.

* * * * *